Oct. 6, 1970   J. R. CASANI ET AL   3,531,988
KNOTMETER
Filed Feb. 19, 1969
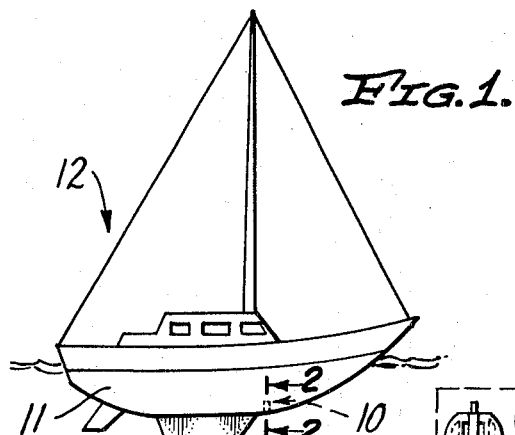
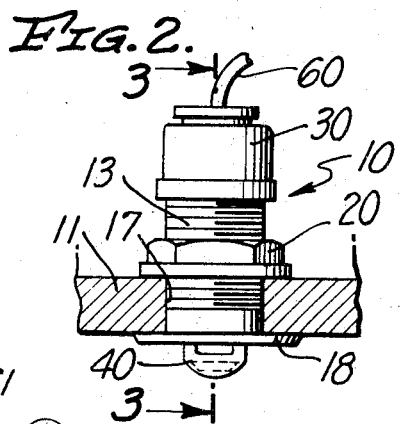
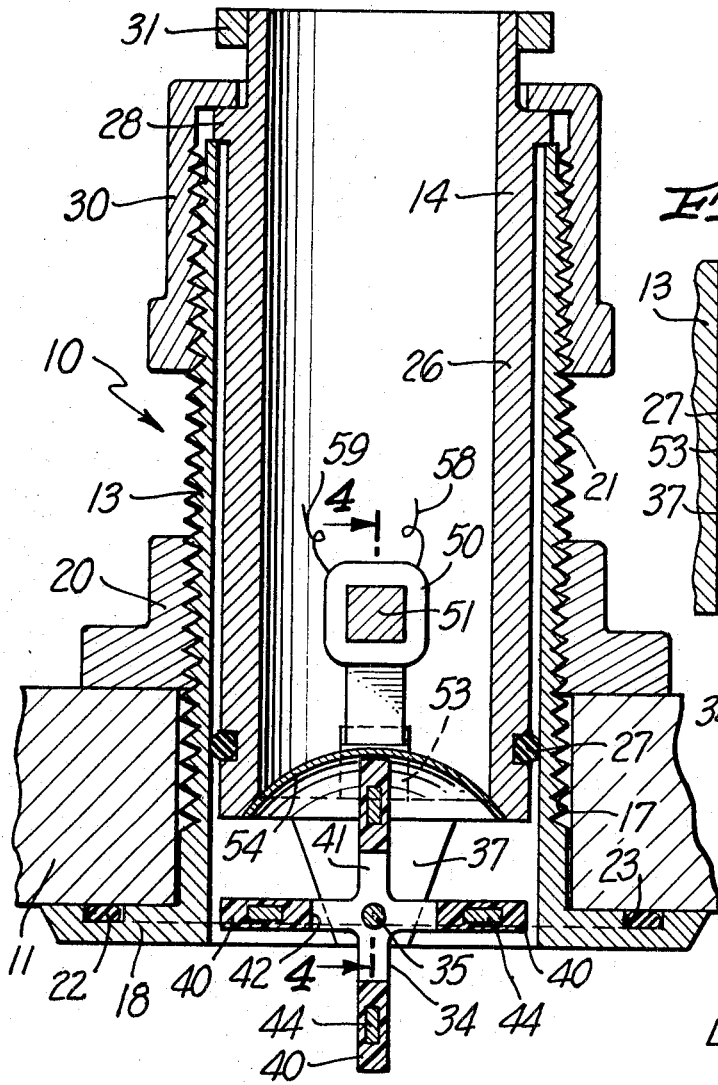
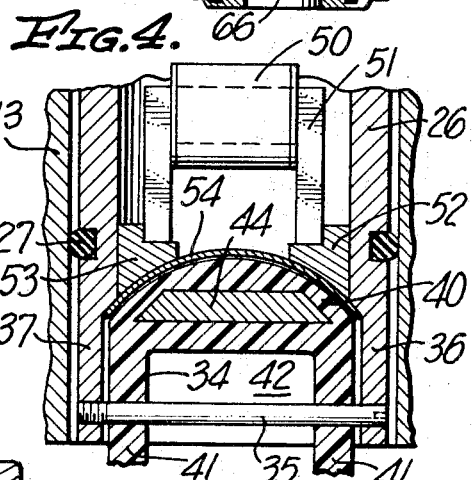
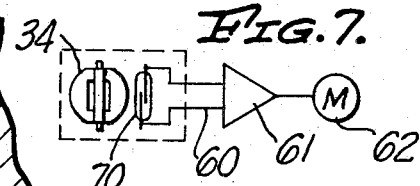
INVENTORS
JOHN R. CASANI,
CHARLES DEICHLER,
EDWIN POUNDER &
DANIEL SCHNEIDERMAN
BY THEIR ATTORNEYS
HARRIS, KIECH, RUSSELL & KERN 3,531,988
KNOTMETER
John R. Casani, Altadena, Charles Deichler and Edwin Pounder, Arcadia, and Daniel Schneiderman, Hollywood, Calif., assignors to Transdynamics, Incorporated, Burbank, Calif., a corporation of California
Filed Feb. 19, 1969, Ser. No. 800,465
Int. Cl. G01p 5/06
U.S. Cl. 73—187   7 Claims

ABSTRACT OF THE DISCLOSURE

A speed and distance indicator for a boat for mounting in the boat hull substantially flush with the surface. A unit which may be installed and removed from within the hull. An open paddle wheel mounted in a housing, with its axis of rotation within the housing and parallel to the hull surface and carrying magnetic members in paddles on arms which project beyond the housing and hull. An electrical pickup in the housing actuated by the moving magnetic members to generate a signal varying as a function of paddle wheel rotation and boat velocity.

---

This invention relates to speed and distance indicators for boats and, in particular, to a new and improved indicator of the type utilizing relative motion of the boat and water to actuate a rotating member which in turn generates an electrical signal which varies as a function of the speed of rotation and thereby as a function of the relative speed of the boat and water.

A variety of constructions have been utilized for speed and distance indicators of this general type and have suffered from various problems including high cost, accuracy, breakage, maintenance difficulties and fouling. It is an object of the present invention to provide a new and improved indicator which is simple and inexpensive to manufacture and install and one which requires little or no maintenance. A further object is to provide such an indicator which has low drag with very little of the structure exposed and which requires no fairing or skeg. A further object is to provide such a speed indicator which can be installed and replaced from the interior of the hull and which can have a plug inserted when the indicator mechanism itself is not being used.

It is a particular object of the invention to provide a new and improved speed and distance indicator utilizing an open paddle wheel carrying one or more magnetic members, with the mounting and axis of rotation of the paddle wheel positioned within the housing so that only the paddles themselves project beyond the hull.

Other objects, advantages, features and results will more fully appear in the course of the following description. The drawing merely shows and the description merely describes a preferred embodiment of the present invention which is given by way of illustration or example.

In the drawing:

FIG. 1 is a side view of a boat with the indicator installed therein;

FIG. 2 is an enlarged partial sectional view taken along the line 2—2 of FIG. 1;

FIG. 3 is an enlarged sectional view taken along the line 3—3 of FIG. 2, illustrating the indicator incorporating the presently preferred form of the invention;

FIG. 4 is a partial sectional view taken along the line 4—4 of FIG. 3;

FIG. 5 is a view similar to that of FIG. 2 showing a plug installed in the hull in place of the paddle wheel and pickup mechanism;

FIG. 6 is an electrical diagram of the instrument; and

FIG. 7 is an electrical diagram similar to FIG. 6 showing an alternative form of pickup unit.

Referring to the drawing, a speed indicator 10 is mounted in the hull 11 of a boat 12. The speed indicator has a housing, which in the preferred embodiment illustrated includes a housing sleeve 13 and a housing body 14.

The sleeve 13 is positioned in an opening 17 through the hull 11 and preferably has a flange 18 at the outer end of the sleeve, which flange rests against the outer surface of the hull. The sleeve is fixed in position on the hull, as by means of a lock nut 20 which engages a set of threads 21 on the exterior of the sleeve. A water-tight seal may be provided between the sleeve and hull as by a seal ring 22 in an annular groove 23 of the flange 18.

The body 14 may include a tube 26 slidably inserted into the sleeve 13 and carrying a seal ring 27 in a groove adjacent the outer end and having a flange 28 adjacent the inner end for abutting the inner end of the sleeve 13. The body may be held in place in the sleeve by a lock nut 30 which threadedly engages the sleeve and which is retained on the body by a retainer ring 31. The abutment of the flange 28 of the body with the inner end of the sleeve controls the position of the body and its mechanism with respect to the outer end of the sleeve and the surface of the hull.

A rotating member and an electrical pickup are carried by the body. The rotating member is positioned for exposure to the water and the electrical pickup is positioned within the body tube and may be encapsulated or otherwise enclosed to protect it from the water.

The rotating member comprises an open paddle wheel 34 mounted for rotation on a shaft 35 supported in projecting arms 36, 37 of the tube 26. The paddle wheel 34 has four paddles 40, each supported on arms 41 and defining an open space 42 between the paddle and the shaft 35. The particular embodiment illustrated utilizes four paddles, but of course fewer or more paddles could be used if desired.

A magnetic member 44 is carried by each paddle, and may comprise a piece of iron or other magnetic material or a permanent magnet, depending upon the particular type of pickup utilized. Of course, the instrument may be utilized with a magnetic member in only one paddle but superior results are achieved with magnetic members in each of the paddles. In the preferred embodiment illustrated, the paddle wheel is a plastic molding with the magnetic members enclosed within the plastic material.

Motion of water past the hull causes rotation of the paddle wheel and moves the magnetic members past the pickup unit in the body of the housing. Various forms of pickup units may be utilized and a preferred structure is illustrated in FIGS. 3 and 4. A coil 50 is mounted on a U-shaped core 51, with pole pieces 52, 53 at the ends of the core. The interior of the body may be sealed by a diaphragm 54 which provides a concave channel for rotation of the paddle wheel. The core 51 and pole pieces 52, 53 may be made as one piece if desired.

Preferably, the pole pieces are contoured to fit the diaphragm 54. In this structure, the sleeve 13, tube 26 and diaphragm 54 would be made of nonmagnetic material typically brass. The core 51 and pole pieces 52, 53 provide a magnetic flux path and the movement of one of the magnetic members 44 past the position between the pole pieces, as illustrated in FIG. 4, produces a change in flux in the flux path. This change in flux results in a change in electrical output of the coil 50 which is connected via leads 58, 59 in a cable 60 to an external electrical circuit.

In the embodiment illustrated utilizing permanent magnets for the magnetic members 44, rotation of the paddle wheel develops an electrical voltage in the coil 50 for operating a meter 62, with indicated output of the meter being a function of the speed of the boat through the water. An amplifier 61 may be used between the coil 50 and meter 62, but is not necessary. The meter can be calibrated to read directly in knots. The output of the coil 50 also may be used to operate an accumulating and display device to indicate distance traveled, such as an odometer. Other pickup units may be utilized in lieu of the units specifically described herein if desired. A magnetic reed switch 70 is shown in place of the coil 50 in FIG. 7. As the magnetic members 44 of the paddle wheel 34 pass the read switch 70, the magnetic flux causes the contacts of the switch to close. The reed switch will make and break an electrical circuit at a frequency which is a function of the speed of rotation of the wheel 34.

The open paddle wheel, particularly with the axis of rotation inboard, provides a speed and distance indicator with a low drag and one which requires no fairing or skeg on the hull. The low drag characteristic serves to improve the accuracy of the instrument as well as improving operation of the boat. The inboard mounting of the paddle wheel and the open construction reduce the tendency for fouling. The open paddle wheel design effectively vents the interior of the cavity to the pressure field in the flow adjacent to the unit, and specifically reduces the minimum boat speed at which the paddle wheel will start and rotate, which is under that minimum obtainable by a closed paddle wheel design when the start is restrained by magnetic forces as in the example.

Once the sleeve 13 is installed in the hull, the body carrying the paddle wheel and pickup unit may be inserted into the sleeve and removed with ease from the interior of the hull. The body is readily removed for cleaning and replacement of the paddle wheel as desired. A plug may be provided for insertion into the sleeve to close the opening in the hull when the body has been removed. A preferred form of plug is illustrated in FIG. 5 and comprises a solid bar or hollow tube 65 carrying a seal ring 66 at the outer end thereof and slidable into the sleeve 13 in the same manner as the body 14. The lock nut 30 may be carried on the plug 65 as it is carried on the tube 26.

The unit provides complete symmetry in measuring boat velocity whether the boat is moving in forward or reverse direction. The unit operates as a drag rather than a lifting device and thus is much less sensitive to cavitation limitations at high speeds than a lifting device, i.e. a propeller. Also, it does not require precise alignment with respect to direction of flow, in order to operate as calibrated. There is no moving part, such as a shaft, projecting through the hull and rotating bearings are lubricated by the water directly.

We claim:
1. In an indicator for a boat, the combination of:
 a housing for mounting in a boat hull, said housing having an open end positioned substantially flush with the surface of the hull;
 a paddle wheel mounted in said housing inboard from said open end for rotation about an axis substantially parallel to the plane of the hull adjacent said housing;
 said paddle wheel comprising a plurality of paddles connected by arms defining open center zones in each paddle, with only said paddles projecting from said housing as said wheel rotates so that said wheel may rotate in either direction in response to movement of said housing in forward and reverse directions;
 a magnetic member mounted in a paddle wheel; and
 a pickup unit mounted in said housing, with rotation of said paddle wheel moving said magnetic member past said pickup unit to generate a signal varying as a function of speed of rotation of said paddle wheel.

2. An indicator as defined in claim 1 in which said housing includes a sleeve and a body, with said sleeve adapted for mounting in an opening through the hull and having a flange at one end for engaging the surface of the hull and defining said open end of said housing, with said body slidable into said sleeve from the other end within the hull in water-sealing relation and terminating adjacent said open end, with said paddle wheel carried at the outer end of said body, and with said pickup unit carried in said body.

3. An indicator as defined in claim 2 including a plug slidable into said sleeve from said other end within the hull in water-sealing relation, said plug extending to said open end and substantially filling said sleeve at said open end.

4. An indicator as defined in claim 2 in which said pickup unit includes a coil and means defining a magnetic path, with rotation of said paddle wheel moving said magnetic member past said path to vary the magnetic flux in said path.

5. An indicator as defined in claim 4 in which said magnetic member is a permanent magnet.

6. An indicator as defined in claim 1 in which said pickup unit includes a coil and means defining a magnetic path, with rotation of said paddle wheel moving said magnetic member past said path to vary the magnetic flux in said path.

7. An indicator as defined in claim 1 in which said pickup unit includes a magnetic reed switch, with rotation of said paddle wheel causing said switch to close and open an electrical circuit.

References Cited
UNITED STATES PATENTS

| | | | |
|---|---|---|---|
| 2,127,847 | 8/1938 | Schulte | 73—229 X |
| 3,287,969 | 11/1966 | Hardy | 73—187 |
| 3,457,782 | 7/1969 | Maeder et al. | 73—187 |

FOREIGN PATENTS

| | | |
|---|---|---|
| 1,388 | 6/1853 | Great Britain. |
| 418,245 | 2/1947 | Italy. |
| 758,755 | 10/1956 | Great Britain. |

LOUIS R. PRINCE, Primary Examiner.

J. W. ROSKOS, Assistant Examiner